United States Patent [19]
Yoshizaki et al.

[11] Patent Number: 5,537,321
[45] Date of Patent: Jul. 16, 1996

[54] DIAGNOSTIC APPARATUS FOR CONTROLLING THE OPERATION OF A CATALYTIC CONVERTER

[75] Inventors: Kouji Yoshizaki, Numazu; Hiroshi Tanaka, Susono, both of Japan

[73] Assignee: Toyota Jidosha Kabushiki Kaisha, Aichi-ken, Japan

[21] Appl. No.: 135,441

[22] Filed: Oct. 13, 1993

[30] Foreign Application Priority Data

| Oct. 15, 1992 | [JP] | Japan | 4-277556 |
| Oct. 15, 1992 | [JP] | Japan | 4-277560 |
| Oct. 8, 1993 | [JP] | Japan | 5-253479 |

[51] Int. Cl.$^6$ .............................. G06F 19/00; F01N 3/00
[52] U.S. Cl. ............................. 364/431.01; 364/431.03; 364/431.05; 60/274; 60/276; 60/277; 60/285; 60/284; 123/691; 123/179.21
[58] Field of Search .................. 364/431.01–431.12; 60/276, 277, 275, 274, 284, 286, 283, 290, 289, 292, 293, 294, 287, 298, 278, 285, 602, 306, 302, 324, 300, 301, 303; 123/3, 179.8, 25 M, 25 F, 409, 568, 576, 407, 339, 527, 575, 685, 520, 700

[56] References Cited

U.S. PATENT DOCUMENTS

| 5,129,228 | 7/1992 | Kondo | 60/274 |
| 5,201,173 | 4/1993 | Fujimoto et al. | 60/285 |
| 5,207,058 | 5/1993 | Sasaki et al. | 60/294 |
| 5,216,880 | 6/1993 | Aoki et al. | 60/276 |
| 5,245,975 | 9/1993 | Ito | 60/283 |
| 5,250,268 | 10/1993 | Geiger | 60/286 |
| 5,257,501 | 11/1993 | Wataya | 60/284 |
| 5,261,230 | 11/1993 | Yuuki et al. | 60/284 |
| 5,271,906 | 12/1993 | Yuuki et al. | 422/177 |
| 5,285,639 | 2/1994 | Araki et al. | 60/274 |
| 5,319,921 | 6/1994 | Gopp | 60/276 |
| 5,333,446 | 8/1994 | Itoh | 60/277 |
| 5,385,017 | 1/1995 | Harada | 60/284 |
| 5,390,493 | 2/1995 | Fujishita et al. | 60/284 |

FOREIGN PATENT DOCUMENTS

| 61-58912 | 3/1986 | Japan. |
| 1-216009 | 8/1989 | Japan. |
| 3-500911 | 2/1991 | Japan. |

*Primary Examiner*—Kevin J. Teska
*Assistant Examiner*—Jacques H. Louis-Jacques
*Attorney, Agent, or Firm*—Oliff & Berridge

[57] ABSTRACT

An exhaust gas purifying apparatus mounted in an vehicular engine, which includes a detector for detecting the actuated condition of a catalyst. Injectors for fuel injection are disposed along an air intake passage of the engine and plurality of catalysts are provided along an exhaust gas passage. A catalyst incorporating an electrical heater is disposed at the most upper stream side thereof. A secondary air source can be supplied into the inlet port of the heatable catalyst by means of secondary air supply mechanism. To determine the activated condition of the catalyst, a temperature sensor is provided to the catalyst. An electronic control unit (ECU) controls the injectors, secondary air supply mechanism, and heatable catalyst when the engine is initiated in the cold state. The ECU computes a temperature change rate of the catalyst based upon a value detected by the temperature sensor while secondary air supply is provided into the inlet port of the heatable catalyst. When the computed temperature change rate is increased, the ECU determines that the heatable catalyst has been actuated and the ECU correctly increases the volume of fuel to be injected through the injectors. Therefore, the catalyst's actuation can be detected without providing a plurality of temperature sensors. Furthermore, no volume of fuel exceeding the required amount is supplied to the engine before the catalyst is actuated.

22 Claims, 12 Drawing Sheets

DIAGNOSTIC APPARATUS FOR CONTROLLING THE OPERATION OF A CATALYTIC CONVERTER

BACKGROUND OF THE INVENTION

1. Field of the Invention

The present invention relates generally to a catalyst for purifying exhaust gas disposed in an exhaust system of an internal combustion engine. More particularly, the present invention relates to a diagnostic apparatus for controlling the operation of a catalytic converter.

2. Description of the Related Art

Generally, three way or reduction type catalytic converters are utilized in the exhaust systems of internal combustion engines for the purpose of reducing three types of toxic exhaust gas emissions: hydrocarbons, carbon monoxide and nitrogen oxides. These converters typically employ platinum, palladium and rhodium coated materials within the converter as catalysts that, once heated to a certain temperature, oxidize or reduce the exhaust emissions which pass through the converter. Car manufacturers often use two converters for an exhaust system: a first mini catalytic converter close to the engine that heats up quickly to reduce emissions during engine warmup, and a main converter placed behind the mini converter to oxidize larger volumes of exhaust emissions. Over a converter's operational lifetime, the desirable physical properties of catalytic materials that quickly heat up and function as efficient catalysts undergo a natural deterioration. With this deterioration, the efficiency of the converter likewise decreases. To counter this tendency, advances have been made to monitor and compensate for the deterioration of the catalytic materials. For example, Japanese Unexamined Patent Publication No. 1-216009 discloses a catalytic diagnostic apparatus which continuously monitors the condition of the catalytic material in order to compensate for the decrease of catalytic efficiency of the converter over time.

In the disclosed apparatus, a catalytic converter is disposed in an exhaust gas passage of an engine. A pair of thermocouples, acting as temperature detecting means, are disposed at the inlet and outlet ports of the catalytic converter. Output signals from the thermocouple are compared immediately after engine startup for an indication of the temperature differential at the inlet and outlet converter ports. In this way, a quantitative and indirect means is provided for detecting the temperature of the catalytic material and consequently, the relative effectiveness of the converter. When the effectiveness of the converter is sufficiently degraded, a malfunction warning apparatus is further provided to inform the automobile operator of the catalytic converter's decreased effectiveness.

However, using thermocouples as described above presents design and manufacturing disadvantages. Manufacturing thermocouple units designed to be placed in both inlet and outlet ports of catalytic converters results in a converter unit that is both bulky and prone to having manufacturing flaws. It is nonetheless advantageous to know the condition of the catalytic material, and thus, efforts continue to design and manufacture an apparatus which detects the condition of the catalytic material and which is simple in construction and design.

SUMMARY OF THE INVENTION

Accordingly, it is a primary objective of the present invention to provide a catalyst temperature detecting means to diagnose the condition of catalytic material within a catalytic converter.

It is another objective of the present invention to provide a catalytic converter for use with an internal combustion engine which allows for the prompt warm-up of the catalytic material without occasioning an increase in exhaust gas emissions.

To achieve the foregoing and other objects and in accordance with the purpose of the present invention, a diagnostic apparatus for controlling operation of at least one catalytic converter disposed in an exhaust system of an engine, said engine having an intake system for mixing air and fuel, comprises detecting means for detecting a temperature of catalyst; computing means for computing a changing rate of the catalyst temperature in accordance with the detected value of the detecting means; and first determining means for determining the activation of the catalyst in accordance with an increase of the computer changing rate.

BRIEF DESCRIPTION OF THE DRAWINGS

The invention, together objects and advantages thereof, may best be understood by reference to the following description of the presently preferred embodiments together with the accompanying drawings, in which.

DETAILED DESCRIPTION OF THE PREFERRED EMBODIMENTS

The first and second embodiments according to the present invention will now be described. The basic mechanical and electrical concepts of a gasoline engine system according to the present invention will be described in the first embodiment. The second embodiment will be described by emphasizing the difference from the first embodiment.

First Embodiment

The first embodiment according to the present invention will now be described referring to FIGS. 1 through 7.

Figure 1:
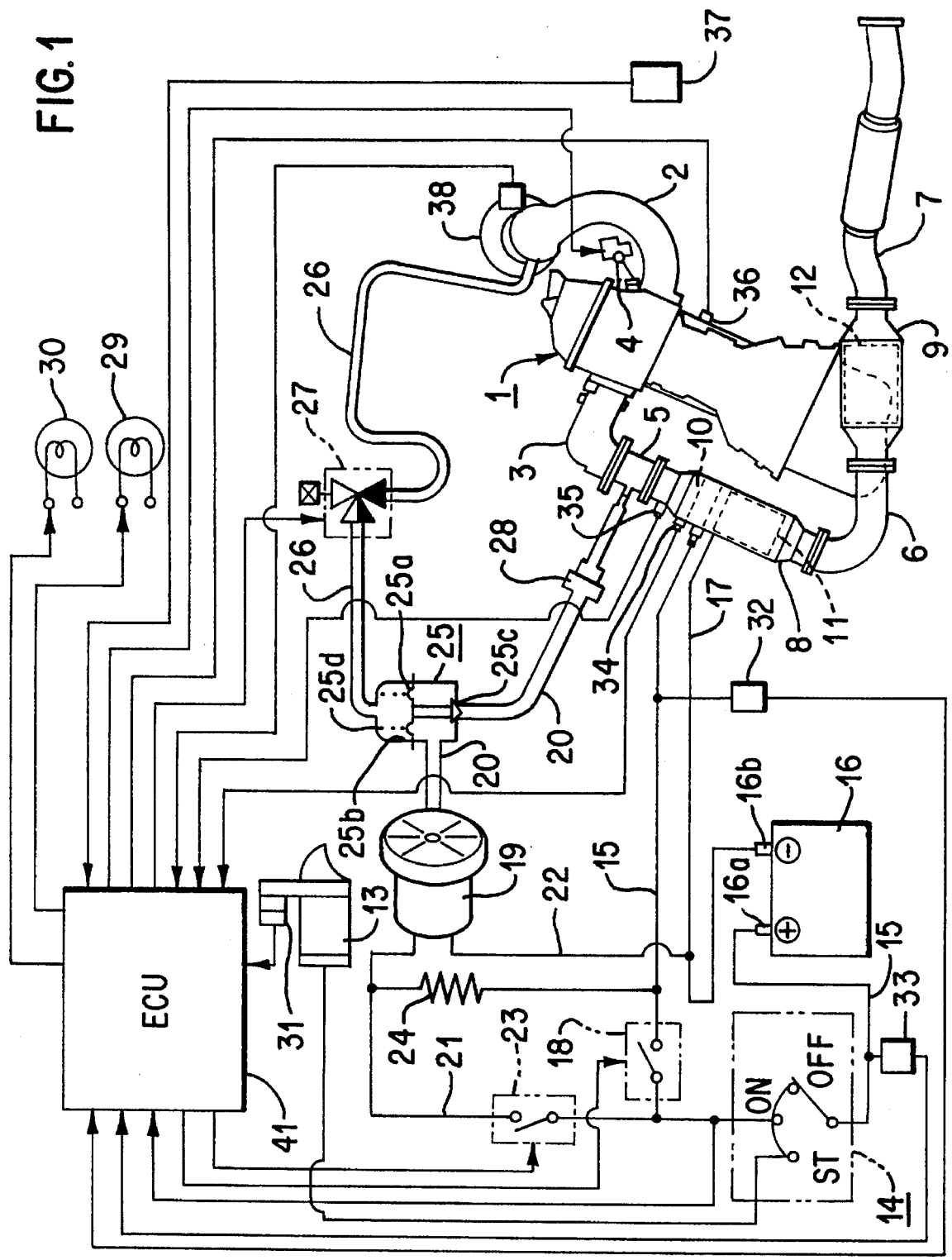
FIG. 1 is a schematic view showing a gasoline engine system according to the first embodiment of the present invention.

As shown in FIG. 1, an engine 1 of a gasoline engine system is an in-line type gasoline engine. The engine 1 communicates with an air intake manifold 2 and an exhaust manifold 3, respectively. Air intake pipes (not shown), etc., communicate with the intake manifold 2 and supply air to the combustion chambers (not shown) of the engine 1. A throttle valve (not shown) for controlling throughput of air to be fed into the combustion chambers is disposed midway along the intake pipes. A plurality of injectors 4 for injecting fuel are disposed in the vicinity of the intake manifold 2 and receive pressurized fuel fed from a fuel tank (not shown) via a fuel pump (not shown). The injected fuel is mixed with air supplied to the engine by conventional means such as by air induction to form a mixture of air-fuel. The air-fuel mixture is then fed into the combustion chambers where it is ignited to provide a combustive force.

The exhaust gases produced from the combustion are vented from the engine through an exhaust manifold 3 to a plurality of exhaust gas pipes 5, 6 and 7 in communication with the exhaust manifold 3. In this way, engine exhaust gases are discharged from the engine to the atmosphere. The exhaust gas pipes 5, 6 and 7 include a first three way catalytic converter 8 and a second three way catalytic converter 9 which are disposed midway along the pies, respectively. It is a well-known fact that the first and second converters 8 and 9 oxidize hydrocarbons and carbon monoxide in the exhaust gas, and deoxidize nitrogen oxide so as to purify the exhaust gas.

Figure 2:
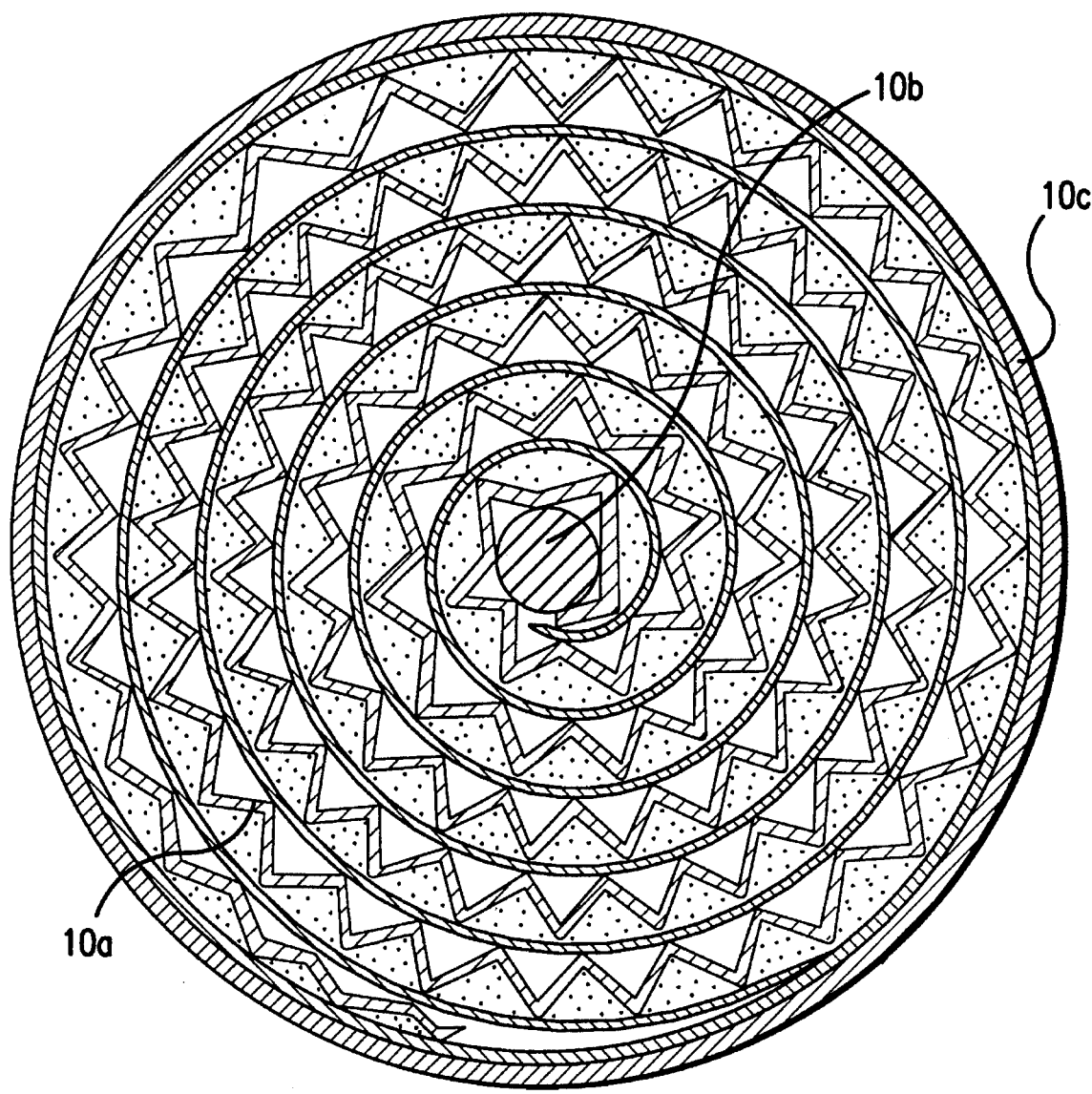
FIG. 2 is a cross section showing the heatable catalyst in FIG. 1.

The first catalytic converter 8 disposed between the exhaust pipes 5 and 6 incorporates both a large and a small three way catalyst. The small catalyst has an electric heater and is defined as a heatable catalyst 10. The large catalyst is defined as a main catalyst 11. As shown in FIG. 2, the catalyst 10 includes honeycomb cores 10a to which the three way catalyst is adhered. An electrode 10b is disposed in the central portion of the honeycomb cores 10a. The section of the converter between a hub 10c and the electrode 10b is electrically heated such that the converter's metal substrate itself heats up. The catalyst 10 is disposed at the inlet port of converter 8 and is principally used when the engine is started from a cold state. The second catalytic converter 9 includes only one main catalyst 12. The main catalyst 12 is formed by the metal catalyst on which the three way catalyst is adhered, similar to the above-described catalyst.

When the engine 1 is to be started, the rotary motion caused by the cranking of a starter 13 disposed in the engine 1 is transmitted to a crank shaft (not shown). A starter switch 31 detects whether the starter 13 is in the ON or OFF state. It is well-known that the starter 13 is switched to either an ON or OFF state according to the ON or OFF condition of an ignition switch (hereinafter referred to as IGSW) 14. The ignition switch 14 can be switched to the position corresponding to either the ON state, OFF state or starting state ST. When the IGSW 14 is switched to the starting state ST from an OFF stagt, the switch bypasses the ON state such that the starter switch 31 detects that the starter 13 is in the ON state. Switch 31 then transmits a starter signal STS indicative of the ON state to the external device.

For actuating the catalyst 10, the electrode 10b disposed in the central portion of honeycomb cores 10a, is electrically connected via a power line 15 and the IGSW 14 to a plus electrode 16a of a battery 16 which also serves as a power source for the vehicle. An outer portion side 10c of the catalyst 10 is electronically connected, via a power line 17, to a negative electrode 16b of the battery 16. Further, to control the power supply from the battery 16 to the catalyst 10, a first relay switch 18 is provided midway along the power line 15. When the relay switch 18 is energized in response to an electric signal, the IGSW 14 is energized by the power line 15. Therefore, the catalyst 10 becomes actuated upon the power supply from the battery 16. Relay switch 18 is de-energized when the switch 18 fails to receive an electric signal, and consequently, the switch 18 breaks the power line supply 15. In this way, power supplied from the battery 16 to the catalyst 10 is terminated. A first voltage sensor 32, disposed along the power line 15 in the vicinity of the catalyst 10, detects the voltage Vc between terminals of the catalyst 10. A second voltage sensor 33, disposed along the power line 15 in the vicinity of the battery 16, detects the voltage (i.e., battery voltage) Vb of the battery 16.

The first converter 8 includes a temperature sensor 34 as a catalyst temperature detecting device for detecting a temperature (i.e., catalytic temperature) THC of the catalyst 10. In the converter 8, an oxygen sensor 35 detects the oxygen density Ox in the exhaust gas and is disposed at the inlet port of the first converter 8.

According to this embodiment, an electric air pump 19 supplies secondary air to an exhaust passage formed from the exhaust pipes 5 through 7 and the catalytic converters 8 and 9. The air pump 19 includes an electric motor for pumping outside air to the exhaust passages. A discharge port of the air pump 19 communicates with the exhaust pipe 5, and is disposed upstream from the inlet port of converter 8 via an air pipe 20. The positive voltage terminal of the of the air pump 19 is electronically connected, via power lines 21, 15, and the IGSW 14, to the plus electrode 16a of the battery 16. A negative voltage terminal of the air pump 19 is electronically connected, via power lines 22 and 17, to the negative electrode 16b of the battery 16. Further, a second relay switch 23 is disposed midway along the power line 21 for controlling the power supply to the air pump 19. When both the IGSW 14 and relay switch 23 are switched to an ON state, the switch 23 completes the circuit between the battery and the air pump 19 thereby actuating the air pump 19. The air provided by the air pump 19 is thereby supplied via the air pipe 20 to the inlet port of the converter 8. When the electric signal is not input to the switch 23, i.e., in the OFF state, switch 23 breaks the circuit between the battery and air pump 19.

In the above-described electric circuit, a resistor 24 is electrically connected between the power lines 15 and 21 for reducing the voltage applied to the air pump 19 when the first relay switch 18 is in the ON state.

An air control valve unit 25 is disposed midway along the air pipe 20. The valve unit 25 includes a pressure chamber 25b which is defined by a diaphragm 25a and the body of unit 25. A valve 25c is secured to the diaphragm 25a. A spring 25d is disposed in the pressure chamber 25b, for urging the diaphragm 25a downward. The valve 25c is held in the position by the urging force of the spring 25d to close the air pipe 20. Vacuum pipe 26 communicates with the pressure chamber 25b, allowing the valve 25cto be held in the position such that air pipe 20 may be opened. In as much as the vacuum pipe 26 communicates with the intake manifold 2, negative pressure from the intake manifold 2 can be induced into the pressure chamber 25b through the vacuum pipe 26. A three way vacuum switching valve 27 (hereinafter referred to as VSV) is disposed midway along the vacuum pipe 26 for regulating the amount of the negative pressure to the pressure chamber 25b and is controlled by an electric signal provided by the Electronic Control Unit ECU 41. When the VSV 27 is energized, it allows negative pressure generated in the air intake manifold 2 to be communicated to the pressure chamber 25b. With this negative pressure, the valve 25c is shifted to the open position against the force of the spring 25d. This allows the air pipe 20 to communicate an air supply from the air pump to the exhaust pipe 5. When the VSV 27 is de-energized on the other hand, outside atmospheric pressure is introduced from the VSV 27 to the pressure chamber 25b thereby causing spring 25d to urge diaphragm 25c downward against the valve 25c. This action effectively interrupts air passage along the air pipe 20. A check valve 28, disposed midway along the air pipe 20, prevents the exhaust gas in the exhaust pipe 5 from entering into the air pipe 20.

A coolant temperature sensor 36, mounted in engine 1, detects the engine coolant temperature THW (i.e., water coolant temperature) while an engine speed sensor 37, also mounted in engine 1 detects the engine speed NE. An air-flowmeter 38 provided in intake manifold 2 detects the air intake volume Q supplied through manifold 2 to the combustion chambers of the engine 1. In this embodiment, the sensors 36, 37 and 38 provide their sensory data as parameters of the running condition of engine 1 to ECU 41. A warning lamp 29 for indicting an irregular voltage supply Vc between the terminals of the catalyst 10 informs the engine operator of an irregular voltage condition, as does warning lamp 30 which indicates an irregular voltage condition of the battery Vb.

According to this embodiment, an electronic control unit (hereinafter referred to as ECU) 41 controls the operations of the injectors 4, heatable catalyst 10, air pump 19, VSV 27 and lamps 29, 30, respectively. Data from the starter switch 31, voltage sensors 32, 33, temperature sensor 34, oxygen sensor 35, coolant temperature sensor 36, engine speed sensor 37 and air-flowmeter 38 are input into the ECU 41 from which the ECU 41 controls the operations of the various engine components.

Figure 3:
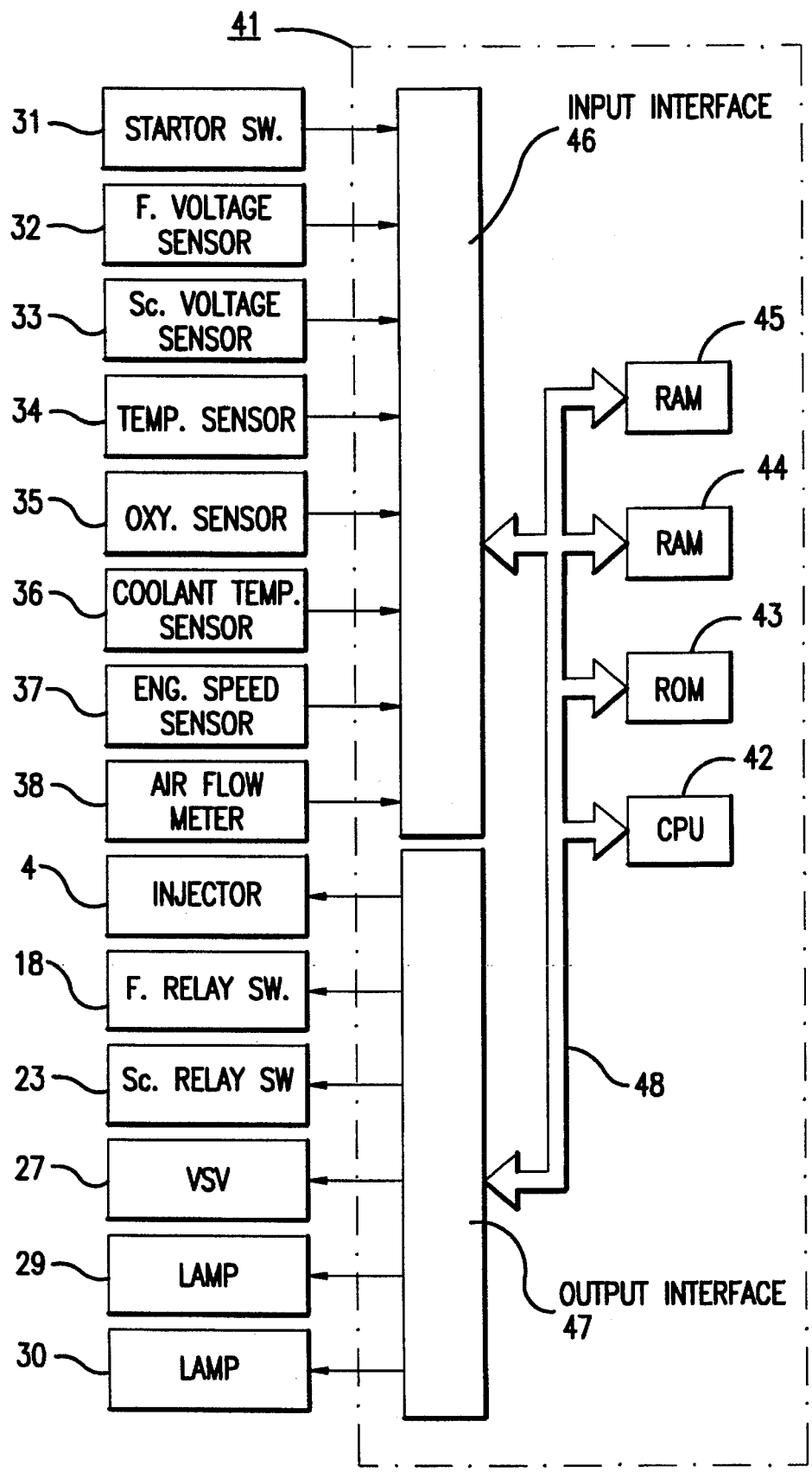
FIG. 3 is a block diagram showing the constitution of an ECU, etc. for controlling the system in FIG. 1.

As shown in FIG. 3, the ECU 41 includes a central processing unit (hereinafter referred to as CPU) 42, a read only memory (hereinafter referred to as ROM) 43 to store various control programs, a random access memory (hereinafter referred to as RAM) 44 to temporarily store the computations of the CPU 42, and a backup RAM 45. The logic circuit formed by the above-described units 42 through 45 together with the input interface circuit 46, output interface circuit 47, and bus 48 comprise ECU 41. According to this embodiment, the CPU 42 also has a free running counter function.

The starter switch 31, sensors 32 through 37 and air-flowmeter 38 connect to the input interface circuit 46, respectively. The output interface circuit 47 connects to the injectors 4, relay switches 18, 23, VSV 27, and lamps 29 and 30. The CPU 42 reads or inputs various signals as input values or data sent from the starter switch 31, sensors 32 through 37 and air-flowmeter 38. The CPU 42 controls the injectors 4, first and second relay switch 18, 23, VSV 27 and lamps 29, 30 via the output interface circuit 47 in response to the input data.

According to this embodiment, the ECU 41 initiates the heating of catalyst 10 and then the supply of air from air pump 19 according to the various signals sent from the starter switch 31, sensors 32 through 34, 36 at the time the engine started up. Specifically, the ECU 41 controls the power supply to the catalyst 10, based on the change in the catalyst temperature THC. To control the timing for terminating the power supply to the catalyst 10, the ECU 41 determines whether the catalyst 10 has been activated, based on the change in the catalyst temperature THC. ECU 41 also controls the fuel injectors 4 at the time of engine startup. From this operation, the ECU 41 carries out an air-fuel ratio feedback control (hereinafter referred to as FB control).

The operations for controlling the secondary air supply to the catalyst as well as the heating of the catalytic material will now be described.

Figure 4:
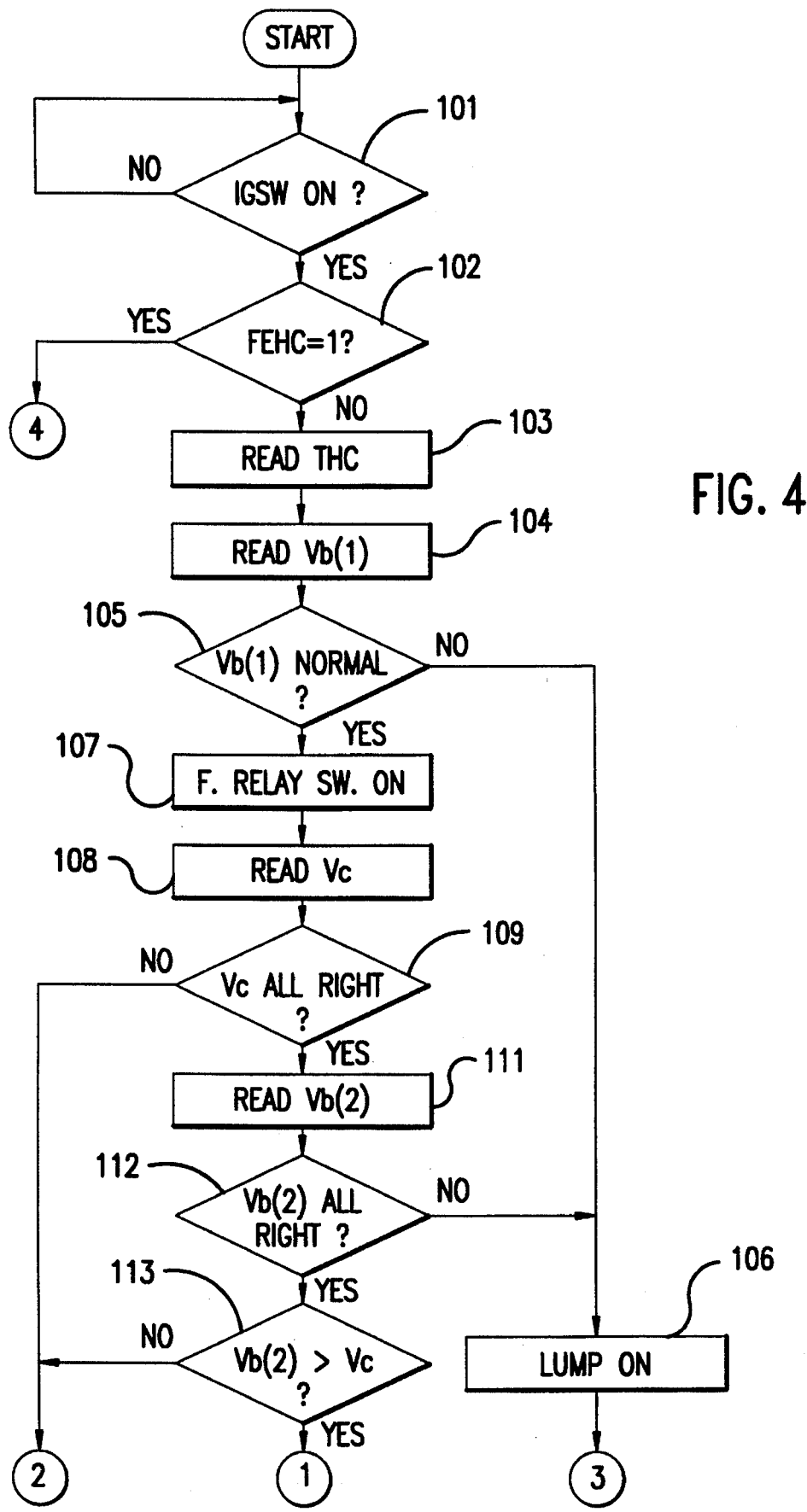
FIGS. 4, 5 and 6 are flowcharts showing the operational routine for controlling the secondary air supply to the catalytic converter and for diagnosing the activating condition of the catalyst, executed by the ECU according to the system in FIG. 1.
Figure 5:
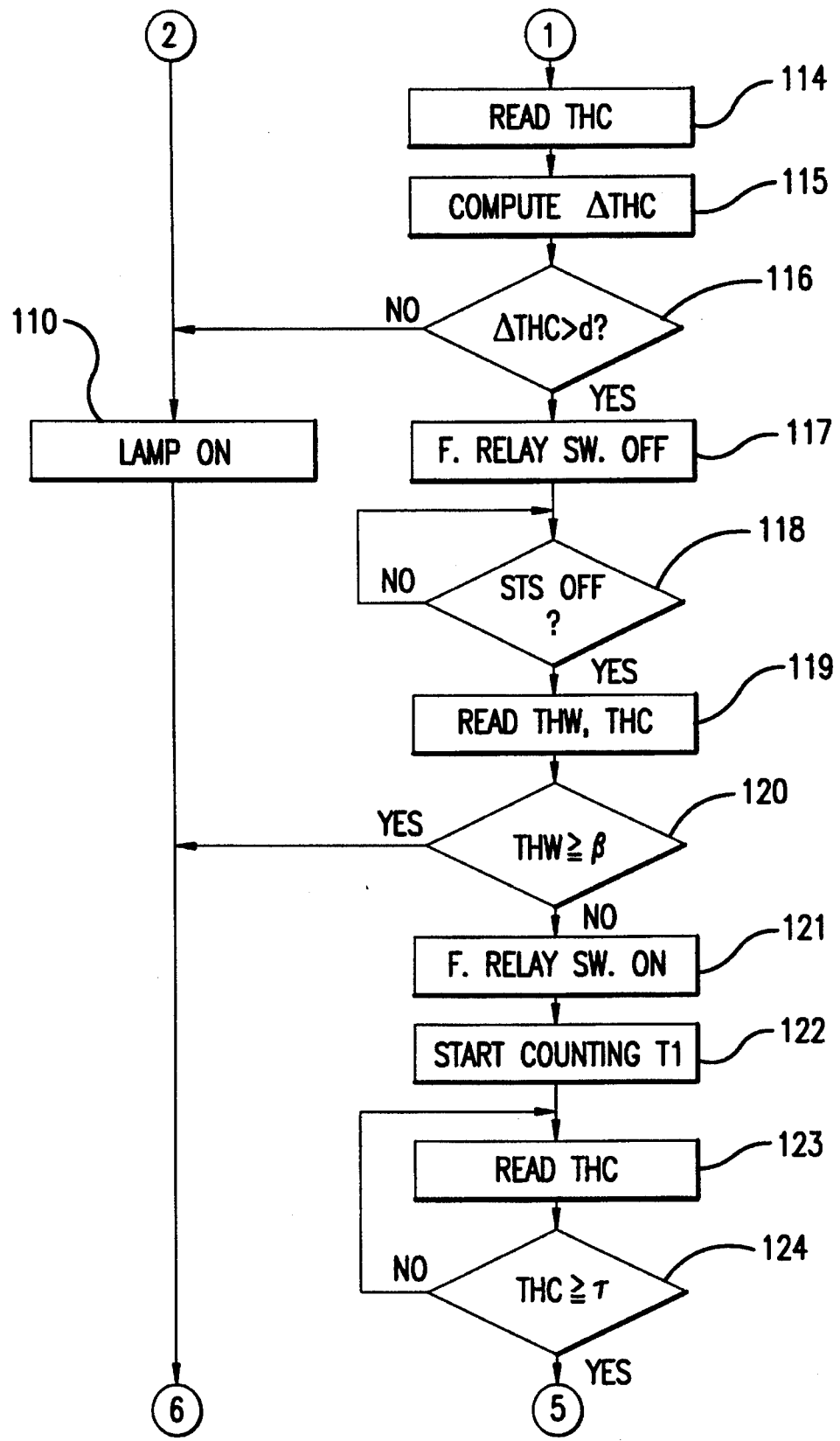
Figure 6:
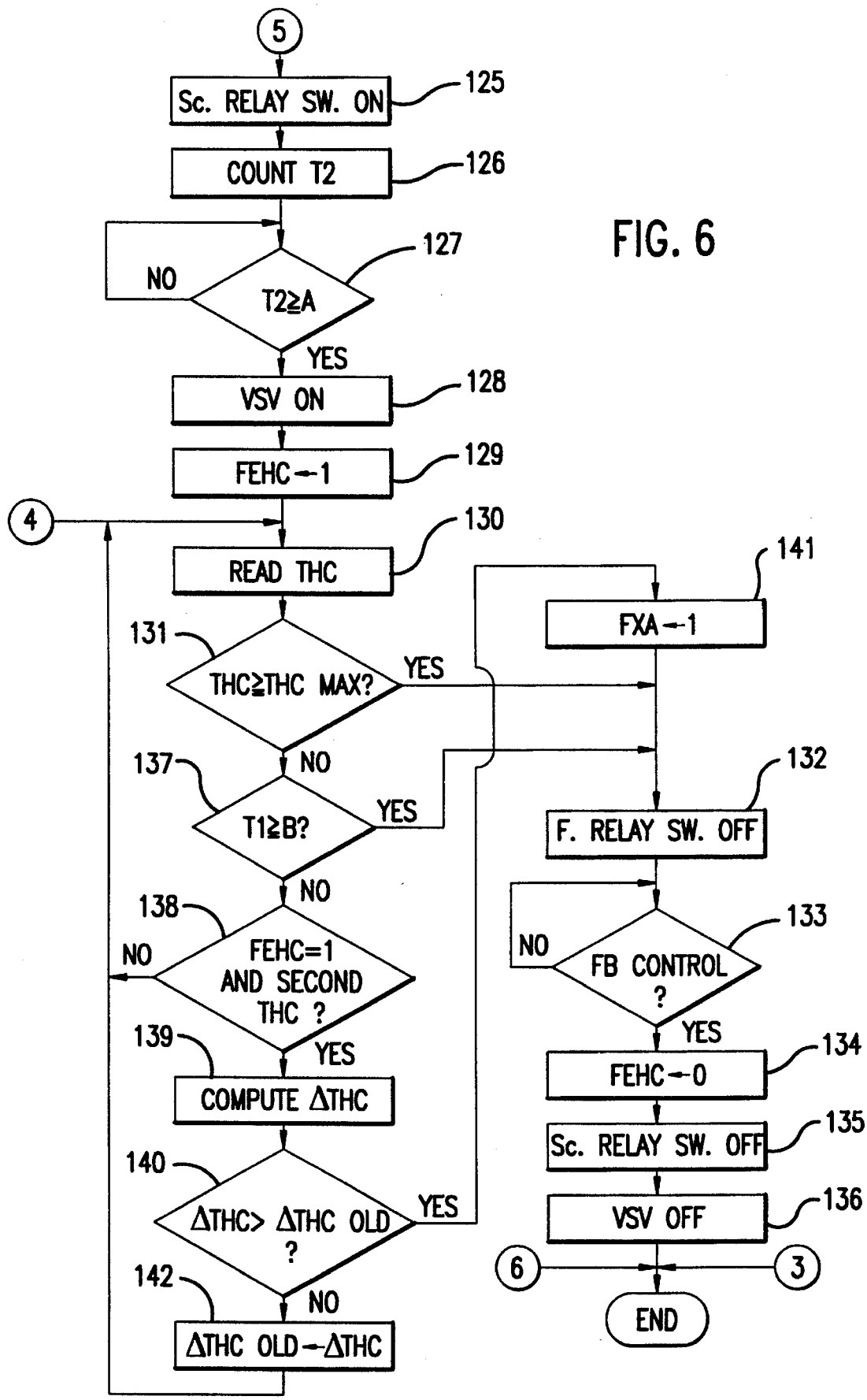

A flowchart shown in FIGS. 4 through 6 describes an operational routine controlling the secondary air supply and the determination of the activation of the catalyst. The operation is carried out when the engine is started.

At step 101, the ECU 41 waits until the IGSW 14 is switched to an ON position. Generally, the IGSW 14 will be switched from the OFF position to the starting position ST by passing through the ON position. This procedure determines that the IGSW 14 is switched to the starting position ST after it was switched to the ON position.

When the IGSW 14 is activated, the ECU 41 determines whether or not the state of warm-up flag FEHC is equal to "1" at step 102. The flag FEHC indicates that the warm-up operation for the catalyst 10 has been started, and will be set at step 129 which will be described afterward. When the state of flag FEHC is equal to "1", the ECU 41 determines that the warm-up operation for the catalyst 10 has been started, and advances to step 130 to carry out the operation at that step. On the other hand, when the state of the flag FEHC is not equal to "1", the ECU 41 reads a catalyst temperature THC based on the detected signal from the temperature sensor 34 at step 103.

At step 104, the ECU 41 reads a battery voltage Vb as a first battery voltage Vb(1), based on the detected signal from the second voltage sensor 33. At step 105, the ECU 41 determines whether or note the value of the first battery voltage Vb(1) is equal to a value predetermined as a normal value. When the battery voltage Vb(1) is not equal to the normal value, the ECU 41 determines that the battery 16 has some problem, and advances to step 106. At step 106, the ECU 41 actuates the warning lamp 30 to warn the driver of a problem relating to the voltage of battery 16, and terminates the operations hereafter.

When the value of the voltage battery Vb(1) is equal to the normal value, the ECU advances to step 107 and determines the condition of the catalyst 10. At step 107, the ECU 41 energizes the first relay switch 18 to initiate a tentative power supply to the catalyst 10. Accordingly, the catalyst 10 starts the self-heating up operation, based upon the power supply thereto.

At step 108, the ECU 41 reads a voltage Vc between the terminals of the catalyst 10, based upon the detected signal from the first voltage sensor 32. At step 109, the ECU 41 determines whether or not the voltage Vc is equal to a normal value, i.e., determines whether or not the voltage Vc is dropped below the required level. When the voltage Vc is not equal to the normal value, the ECU 41 determines that the catalyst 10 has some problem, and advances to step 110. At step 110, the ECU 41 actuates the warning lamp 29 to warn the driver of a problem relating to the catalyst 10, and terminates the operations hereafter.

When the voltage Vc is equal to a normal value at step 109, the ECU 41 reads a value of the battery voltage Vb as a second battery voltage Vb(2), based upon the detected signal from the second voltage sensor 33 at step 111. That is, the ECU 41 reads the value of the battery voltage Vb after the experimental power supply to the catalyst 10 was carried out. At step 112, the ECU 41 determines whether or not the second voltage value Vb(2) is equal to a normal value, i.e., determines whether or not the battery voltage value Vb(2) is dropped below the required level. When the voltage value Vb(2) does not equal the normal value, the ECU 41 advances to step 106, and illuminates the warning lamp 30 to warn the driver that a problem relating to battery 16 exists, and terminates the operations hereafter.

On the other hand, at step 112, when the second voltage value Vb(2) is determined to equal the normal value, the ECU 41 compares the second voltage Vb(2) with the voltage value Vc between the terminals. Further, the ECU 41 determines whether or not the second voltage value Vb(2) is larger than the voltage value Vc. When the battery voltage Vb(2) is not larger than the voltage Vc, the ECU 41 determines that the catalyst 10 has some problem, and advances to step 110. At step 110, the ECU 41 illuminates the warning lamp 29, and then terminates the operations hereafter.

When the battery voltage Vb(2) is larger than the voltage Vc at step 113, the ECU 41 reads a catalyst temperature THC, based upon the detected signal from the temperature sensor 34. Further, the ECU 41 computes a temperature changing rate ΔTHC as a changing rate of the catalyst temperature THC at step 115. The temperature changing rate ΔTHC is computed by taking the difference between the catalyst temperature THC read at step 103 and the catalyst temperature read at step 114. At step 116, the ECU 41 compares the computer temperature changing rate ΔTHC with a preset value α, and determines whether or not the value of the changing rate ΔTHC is larger than the preset value α. However, the preset value α can be altered according to the first read catalyst temperature THC at step 103, or it can be set to a constant value. When the value of the changing rate ΔTHC is not larger than the preset value α, the ECU 41 determines that the catalyst 10 has some problem, and then advances to step 110, actuates the warning lamp 29, and terminates the operation.

On the other hand, when the value of the changing rate ΔTHC is larger than the preset value α at step 116, the ECU 41 determines that the battery 16 and the catalyst 10 are functioning properly, and advances to step 117. At step 117, the ECU 41 temporarily terminates the experimental power supply from the battery 16 to the catalyst 10 by de-energizing the first relay switch 18.

The above-described operations of steps 101 through 117 are carried out during the cranking operation of the engine 1 during its startup. At step 117 following step 118, the ECU 41 waits until the state of the starter signal STS, sent from the starter switch 31, changes from the ON to the OFF state. When the starter signal STS changes its state from being ON to OFF state, the ECU 41 determines that the cranking operation by the starter 13 has been completed, i.e., the initial combustion stroke has been completed, and then the ECU 41 advances to step 119. At step 119, the ECU 41 reads the coolant temperature THW and catalyst temperature THC according to the signals sent from the sensors 36 and 34, respectively.

At step 120, the ECU 41 determines whether or not the coolant temperature THW has risen to a preset value β which indicates the warm-up operation has completed. When the coolant temperature THW is risen to the preset value β, the ECU 41 determines that the engine 1 is already warmed up enough for starting in the warm state, and then terminates the operations hereafter. On the other hand, when the temperature THW has not risen to the preset value β, the ECU 41 determines that the engine 1 is not warmed up enough for starting in the cold state, and then advances to step 121. At step 121, the ECU 41 energizes the first relay switch 18 to permit the power to be supplied from the battery 16 to the catalyst 10 for warming up the catalyst 10. Accordingly, the catalyst 10 starts the self-warming up operation. When the relay switch 18 is energized, the air pump 19 is initiated by the low voltage through the resistance 24.

Figure 7:
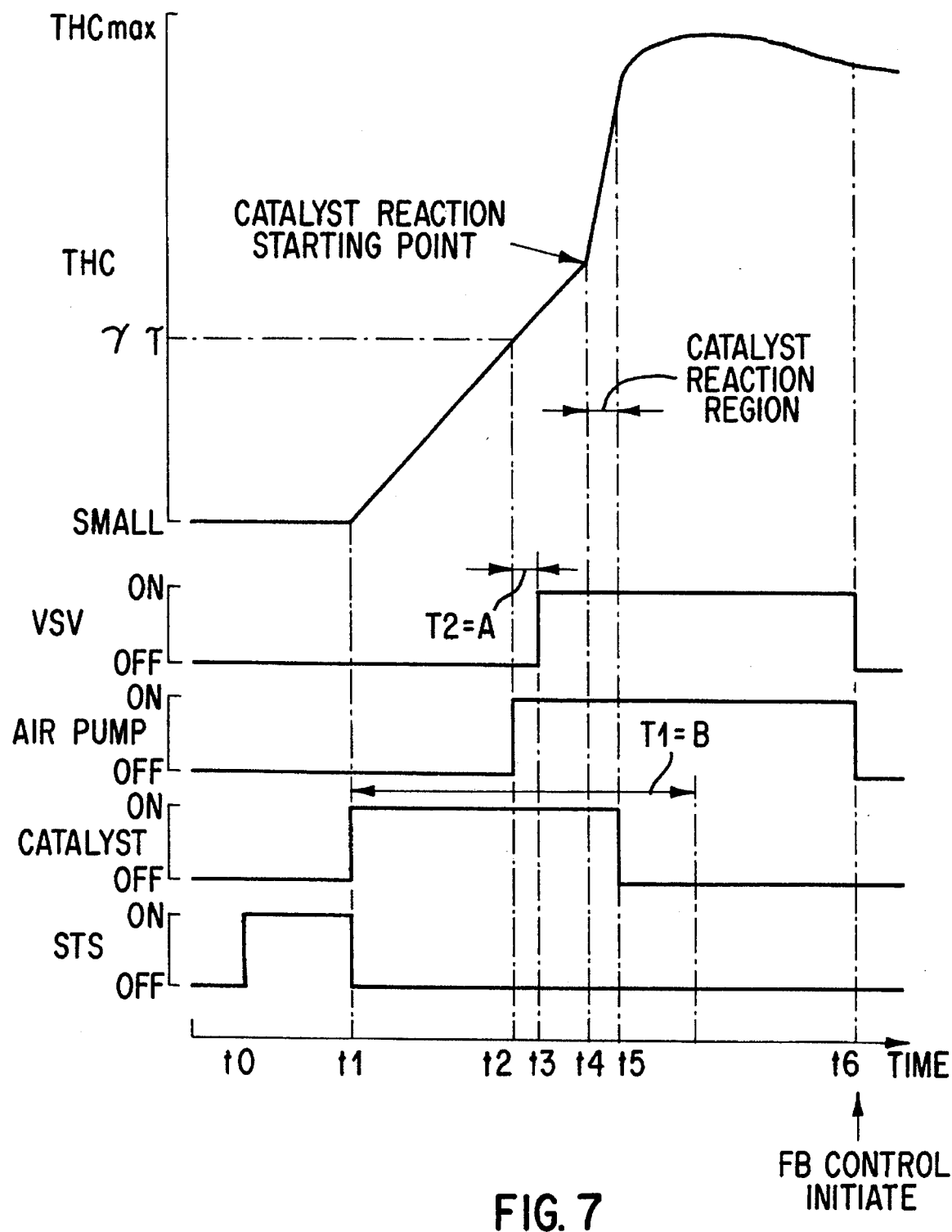
FIG. 7 is a time chart which corresponds to the flowchart in FIGS. 4, 5 and 6.

The ECU 41 next begins to compute a value corresponding to an elapsed time T1, illustrated in FIG. 7, after the power supply operation to the catalyst was carried out, with the free running counter of the CPU 42.

At step 123, the ECU 41 reads the catalyst temperature THC in response to the signal sent from the temperature sensor 34. Then at step 124, the ECU 41 determines whether or not the temperature THC has risen to the preset value γ. If the temperature THC is determined not to have risen to the preset value γ, the ECU 41 jumps to step 123, and repeats the operations at steps 123 and 124. Consequently, the ECU 41 waits until the temperature THC rises to the preset value γ. On the other hand, when the temperature THC rises to the preset value γ at step 124, the ECU 41 determines that the temperature of the catalyst 10 is sufficiently high enough to for the catalytic materials of catalyze the exhaust emissions, and moves to step 125 to carry out the next operation.

At step 125, the ECU 41 energizes the second relay switch 23 to allow power from the battery 16 to actuate the air pump 19. In this way, the ECU 41 controls the initial supply of secondary air to the exhaust system.

At step 126 after the actuation of air pump 19, the ECU 41 starts computing a value corresponding to an elapsed time T2 of FIG. 2 using a running counter of the CPU 42. At step 127, the ECU 41 waits until the elapsed time T2 reaches a preset value A which is predetermined to indicate that enough secondary air has been initially delivered to the exhaust system. At a time whenT2 reaches the preset value A, the ECU 41 then actuates the VSV 27 at step 128.

The VSV 27 allows vacuum or negative pressure produced from air intake manifold 2 to be communicated through the vacuum pipe 26 to the pressure chamber 25c of the air control valve unit so that the valve 25c can be shifted to an open position allowing for uninterrupted communication through the air pipe 20. Since at this time, the air pump 19 has been already been actuated, when valve 25c is shifted to an open position, secondary air is immediately supplied into the exhaust gas passage from the upper stream side of the first converter 8 as the secondary air through the air pipe 20.

At step 129, the ECU 41 sets the value of the warm-up flag to "1". At step 130, which the ECU 41 advances to either from step 102 or step 129, the ECU 41 determines that the amount of oxygen in the initial supply of secondary air is sufficient for the catalytic materials in converter 8 to catalyze any initial gas emissions produced by engine 1. ECU 41 then reads the catalyst temperature THC, based upon the signal from the sensor 34. At step 131, the ECU 41 determines whether or not the value of the temperature THC is risen to the maximum value THCmax which is the maximum allowable temperature the catalyst can take. When the temperature THC is reaches a maximum value THCmax, the ECU 41 determines that the catalyst 10 has in fact been activated, and advances to step 132 to terminate the warm-up operation of the catalyst 10.

At step 132, the ECU 41 de-energizes the relay switch 18 to terminate the supply of power from the battery 16 to the catalyst 10 thereby temporarily terminating the warm-up operation. At step 133, the ECU 41 waits to receive a signal from the oxygen sensor 35 for the FB control indicative of the engine's air-fuel ratio. When the FB control is initiated, the ECU 41 resets the value of the flag FEHC to "0" at step 134. At step 135, the ECU 41 de-energizes the second relay switch 23 to terminate the power supply from the battery 16 to the air pump 19. Furthermore, at step 136, the ECU 41 closes the VSV 27. Accordingly, the pump 19 is caused to step, and the valve 25c of the valve unit 25 is shifted to the closed position by means of the VSV 27 so as to close the air pipe 20 and the supply of secondary air to the exhaust gas passage is terminated.

On the other hand, at 131, when the temperature THC has not risen to a maximum value THCmax, the ECU 41 advances to step 137 in order to determine the timing for activating the heating of catalyst 10. At step 137, the ECU 41 determines whether or not the value of the elapsed time T1 has reached a reference value B for terminating the power supply to the catalyst 10. If T1 has reached B, the ECU 41 terminates the warm up operations of the catalyst 10, and advances to steps 132 through 136 to terminate the supply of secondary air by the air pump 19.

If at step 137, the elapsed time T1 has not reached the preset value B, the ECU 41 advances to step 138 to determine the temperature of the catalyst 10. Then at step 138, the ECU 41 determines whether or not the operation for reading the catalyst temperature has been carried out for a second time at step 130, after the flag FEHC was set to "1" at step 129. If the temperature has not been read, the ECU 41 returns to and carries out the procedure at step 130.

Upon reading the catalyst temperature THC at step 138, the ECU 41 next computes a catalyst temperature change rate $\Delta$THC at step 139. The ECU 41 computes the changing rate $\Delta$THC by taking the difference between the current value of the catalyst temperature THC read at step 130 and the previous value of the catalyst temperature THC read during the last operation. At step 140, the ECU 41 determines whether or not the changing rate $\Delta$THC computed this time is larger than the value of the change rate $\Delta$THCold computed during the previous operation. When the current value of the change rate $\Delta$THC is larger than the previous value of the change rate $\Delta$THCold, the ECU 41 determines that the changing rate $\Delta$THC has in fact changed. In other words, the ECU 41 determines that the catalyst 10 has been activated and advances to step 141. At step 141, the ECU 41 sets the value of the flag FXA to "1" which indicates that the catalyst 10 has begun it's operation. As the catalyst 10 starts reacting, the reaction heat causes a further increase in the temperature of the catalyst 10 and likewise in the change of $\Delta$THC. In this way, ECU 41 can use the change in the value of the temperature change rate $\Delta$THC for determining the operational state of the catalyst 10.

Under circumstances where the flag FXA is set to 1, the ECU 41 advances to step 132 where it terminates the catalyst's initial heat-up operation. At step 132, the ECU 41 de-energizes the first rely switch 18 which terminates the supply of power from the battery 16 to the catalyst 10. The ECU 41 next advances to steps 133 through 136.

If, at step 140, the value of the current temperature change rate $\Delta$THC is determined to be smaller than the previous temperature change rate $\Delta$THCold, the ECU 41 determines that the value of the current temperature change rate has remained unchanged. In other words, the ECU 41 determines that the catalyst 10 has not been actuated at which time undertakes the operations at step 142. There, the ECU 41 sets the current value of the temperature change rate $\Delta$THC as the previous changing rate $\Delta$THCold, and then returns to the operation previously described at step 130.

The above-mentioned operations will now be described referring to a time chart in FIG. 7. This time chart shows the correlation among the starter signal STS, operation of the catalyst 10 and VSV 27, and the change in the catalyst temperature THC when the engine is started from a cold state.

Following the actuation of ISGW 14 at time t0, the starter signal STS is switched from On to OFF at time t1. Power is next supplied to the catalyst 10 to allow the catalyst heating process to begin. As expected, the catalyst temperature THC detected by sensor 34 and read by the ECU 41, also begins to increase.

At time t2, when the temperature THC reaches the preset value $\gamma$, the air pump 19 is actuated by the electric power from the battery 16. Immediately following this, ECU 41 calculates an elapsed time period T2, from a time t2 to a time t3, based on a preselected value A. From this value, ECU 41 determines when to actuate VSV 27. Upon the actuation of valve 27, secondary air begins to be supplied to the exhaust passage. Although this supply of air initially causes a cooling of the catalytic material and a consequent drop in the $\Delta$THC (not shown by the graph of FIG. 7), the overall progression of $\Delta$THC is that of a gradual increase.

Time t4 indicates a point when the temperature THC has reached a point where converter 10 can efficiently remove the toxic emissions from the engine exhaust. Also at this point in time, the change in rate of the catalyst temperature $\Delta$THC undergoes a marked increase due to the reaction of the oxygen supplied to the catalyst 10 by the air supply.

After that, but prior to a time when T1 equals the reference value B, the ECU 41 determines whether the temperature change ratio $\Delta$THC has risen beyond a point required for efficient catalytic operation, and consequently, whether the catalyst heating can be terminated. At a time t6, when the FB control for the air-fuel ratio is initiated, the air pump 19 and VSV 27 are simultaneously switched off so as to terminate the supply of the secondary air to the exhaust gas passage.

Figure 8:
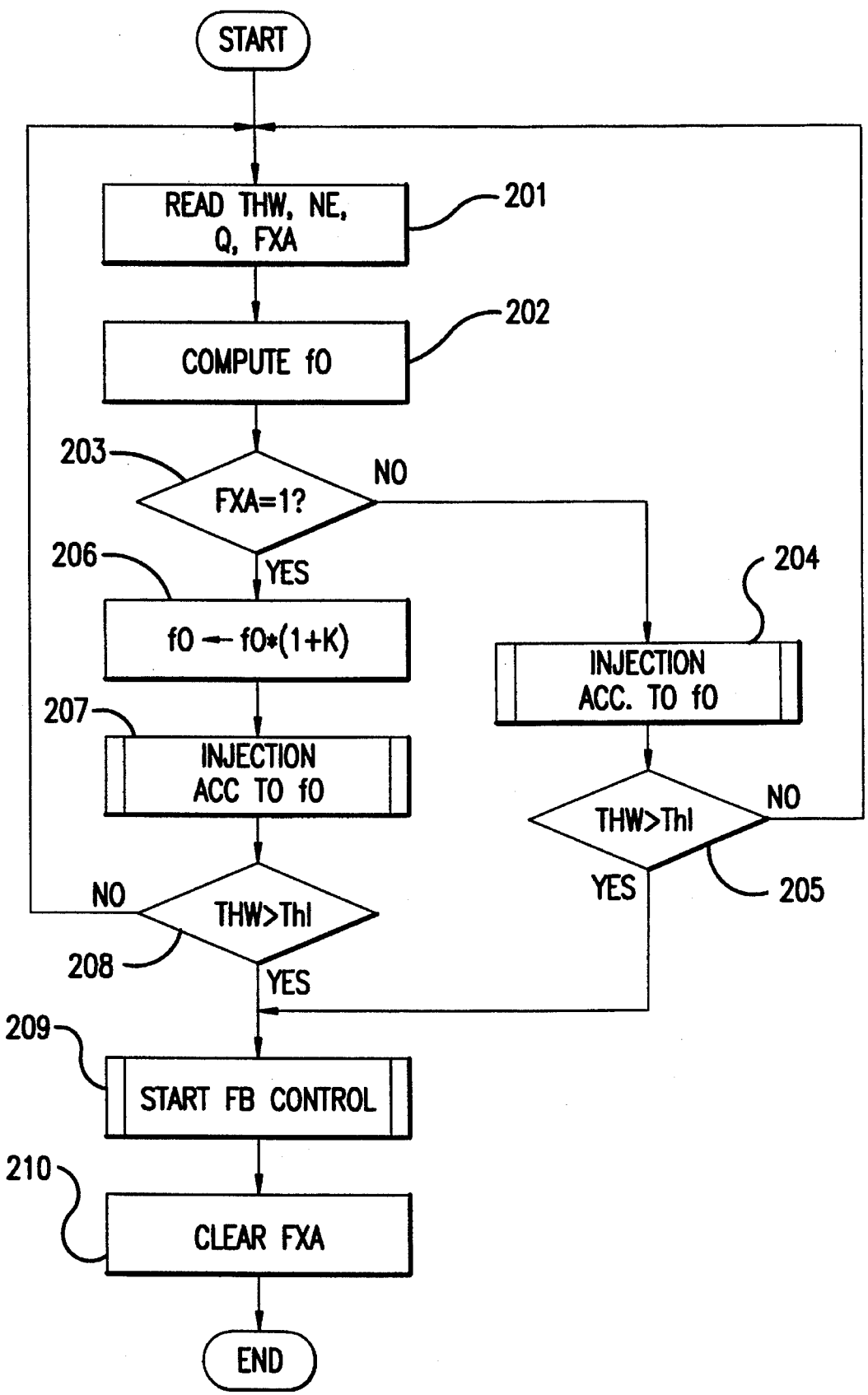
FIG. 8 is another flowchart showing the operational routine for controlling the fuel injection volume, which is executed by the ECU according to the system in FIG. 1.

The operations of the fuel injection control which is carried out by the ECU 41 when the engine starts will now be described. A flowchart in FIG. 8 shows an operational routine of the control operation carried out when the IGSW 14 is switched to the ON position.

At step 201, the ECU 41 reads a coolant temperature THW, engine speed NE, and intake air volume Q, based upon the detected values from the sensors 34, 35 and 36 respectively. The ECU 41 also detects the value of flag FXA set in the previous operational routine. At step 202, the ECU 41 computes an initial target volume of fuel fo to be injected at the start of engine operations. This target volume is computed using an equation involving coolant temperature THW, engine speed NE, and intake air volume Q and represents the minimum required volume of fuel for starting the engine.

At step 203, the ECU 41 determines whether or not the value of the flag FXA is equal to "1". When the value is not equal to "1", the ECU 41 determines that the catalyst 10 is inactivated, and advances to step 204. Then at step 204, ECU 41 carries out the fuel injection into the intake manifold 2 according to the injection volume f0 computed at step 202 and advances to the routine at step 205. Next at step 205 the ECU 41 determines whether or not the engine coolant temperature THW is larger than the preset value Th1. If value THW were larger than value TH1, the ECU would first, determine that the catalytic warm-up process had been completed and second, the ECU 41 would advance to the operation at step 209. On the other hand, when the temperature THW is smaller than the preset value Th1, the ECU 41 would determine that the engine 1 has not warmed up enough and consequently would repeat the operations starting at step 201.

However, if at step 203 the ECU 41 determines the value of the flag FXA to be equal to "1", then the ECU 41 recognizes that the actuation of the catalyst 10 has been completed, and advances to step 206. At step 206, the ECU 41 increases the injection volume f0 computed at step 202 by a correction coefficient K (i.e., 0<K<1), and sets the increased injection volume as a new injection volume f0. The correction coefficient K is the value corresponding to the increased fuel volume required to generate sufficient heating energy for warming up at least either one of the main catalyst 11 or 12. For example, when the correction coefficient K is equal to "0.1", it means that the injection volume f0 computed at step 202 is increased by ten percent (10%).

At step 207, the ECU 41 carries out the fuel injection operation according to the injection volume f0 computed at step 206.

After step 207, the ECU 41 advances to step 208. At step 208, the ECU 41 determines whether or not the coolant temperature THW read at step 201 is larger than a preset value Th1. When the coolant temperature THW is not larger than the preset value Th1, the ECU 41 determines that the engine 1 is not warmed up enough, and returns to carry out the operation at step 201. On the other hand, when the temperature THW is larger than the present value Th1, the ECU 41 determines that the engine 1 is warmed up enough, and advances to step 209.

At step 209, to which the ECU 41 advances either from step 205 or 208, the FB control, i.e, the air-fuel ratio of the engine is adjusted based on the signal sent from the oxygen sensor 35. At step 210, the ECU 41 then clears the value of the flag FXA to "0", and terminate the operation hereafter. In this way, the fuel injection control influences the delivery of the secondary air supply.

Figure 9:
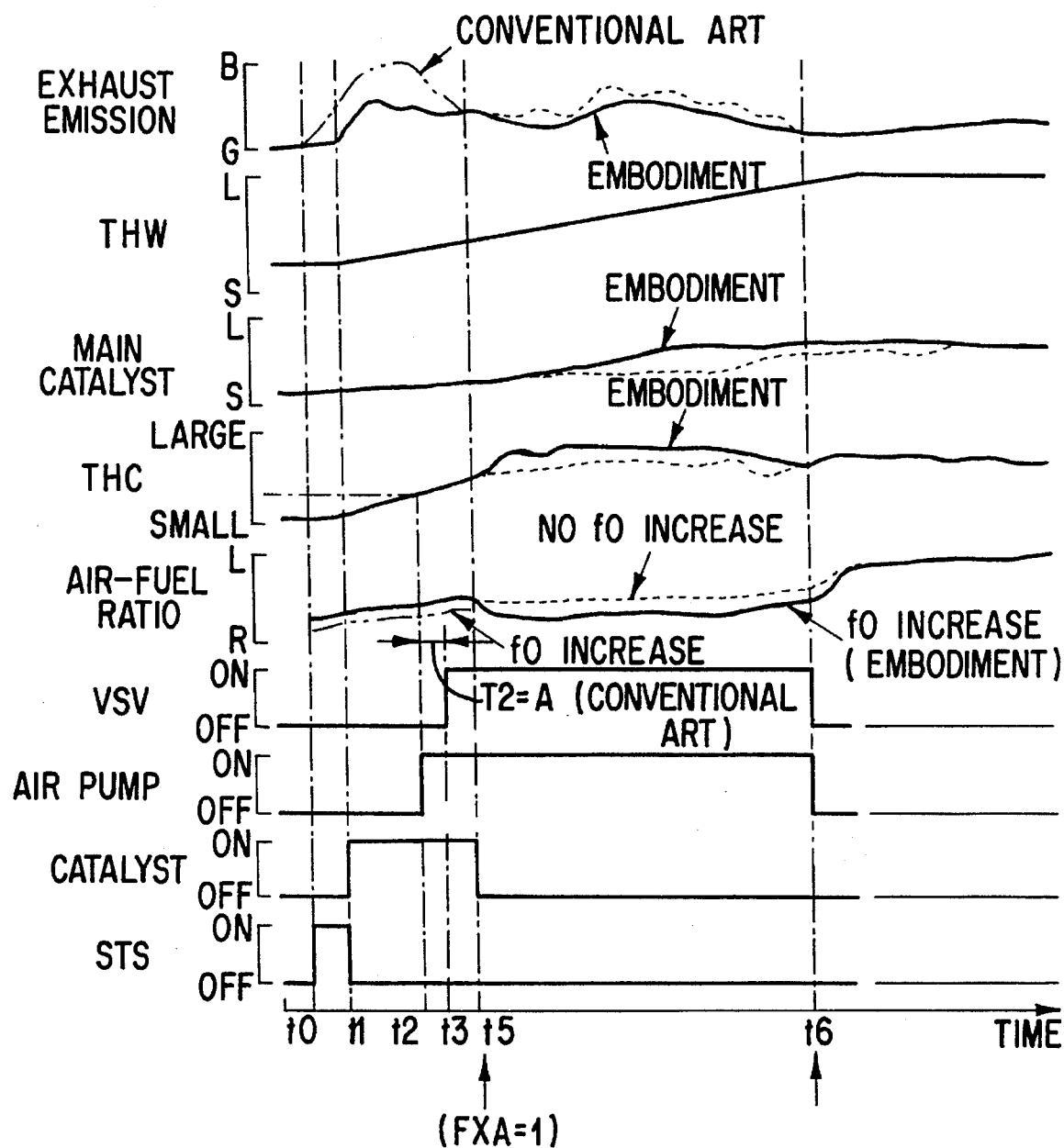
FIG. 9 is a time chart which corresponds to the flowchart in FIGS. 4, 5, 6 and 8.

The operations of the secondary air supply control and the fuel injection control will now be described referring to the time chart in FIG. 9. This time chart describes the operations of starter signal STS, catalyst 10, air pump 19, VSV 29, and the change in the air-fuel ratio at the upper stream side of the catalyst 10. The times t0 through t6 in this time chart correspond to the times illustrated in FIG. 7.

Following the switching if IGSW 14 to an ON state at time t0, the starter signal STS is switched from an ON to OFF state at step t1. It is at this time that the catalyst 10 starts it's warm up operation due to the supply of power the catalyst 10 receives from the battery 16. Simultaneously the catalyst temperature THC starts rising as shown by a solid line in FIG. 7. The air-fuel ratio is obtained using the injection volume f0 and data from oxygen sensor 35 as shown in FIG. 9.

At time t2, the value of the catalyst temperature THC reaches the preset value γ for the activation completion temperature, the air pump 19 is energized. At time t3, when the elapsing time T2 passes away since time t2, i.e., the period of time since the air pump 19 was activated reaches the reference value A, the VSV 27 is activated. As the VSV 27 was activated, the secondary air supply to the exhaust gas passage is initiated. Therefore, since oxygen as the secondary air is supplied to the catalyst 10 which has become activated, the catalyst 10 gradually rises its temperature.

At time t5, when the state of the flag is changed from "0" to "1" as the catalyst 10 reaches the activation completion temperature according to the temperature changing rate ΔTHC, the catalyst 10 is de-energized for terminating the self-warming up operation. Simultaneously, the value of the injection volume f0 is switched from the minimum required fuel volume at the engine start up to a value increased by a volume required for warming up the main catalyst 11, etc. As a result, the air-fuel ratio enriches as shown by the solid lines in FIG. 9 allowing un-burnt elements in the exhaust gas to increase. However, when the catalyst 10 is activated and has completed the warming-up operation, enough oxygen for satisfying the catalytic reaction is supplied through the secondary air. Therefore, even when the warming-up operation for the catalyst 10 is terminated, the effective catalytic reaction by the catalyst 10 is not effected.

The catalytic reaction of the main catalyst 11 disposed at lower stream side of the catalyst 10 is accelerated by the heat generated when the un-burnt elements in the exhaust gas react with the oxygen in the secondary air and the heat of the exhaust gas itself. Accordingly, the temperature of the main catalyst 10 undergoes a rapid rise. As the main catalyst 11 warms up, the amount of exhaust emissions discharged to the outside atmosphere decreases becomes a preferable condition as shown by the solid line. As shown in FIG. 9, the changes of the air-fuel ratio, catalyst temperature THC, temperature of the main catalyst 11, and exhaust gas emission since time t5 are described by the solid lines respectively according to the present embodiment in which the injection volume f0 is increased. The changes in which the injection volume f0 is not increased are indicated by broken lines, respectively.

After that, at step t6, when the FB control is initiated, the air pump 19 and VSV 27 are de-energized, and the secondary air supply to the exhaust gas passage is terminated.

According to this embodiment, the increase of the fuel injection volume f0 to the fuel injectors starts from a time t5, at the actuation and warm up of the catalyst 10, rather than the time when the starter signal STS was changed from ON to OFF at time t1. In the conventional apparatus, the air-fuel ratio, at time t0 through t5 as shown by a two dotted line, frequently tends to become over enriched causing a significant increase in the amount exhaust gas emissions produced. However, according to the present embodiment, the increase in exhaust gas emissions due to increases in the fuel injection volume is effectively controlled.

As described above, according to this embodiment, the power supplied to the catalyst 10 and air pump 19 is regulated by actuating the catalyst 10 first and air pump 19 second. This way, the catalyst 10 and air pump 19 are not simultaneously actuated preventing an undesirable loading of the battery 16. With a reduced demand for power consumption, the loaded demanded on the engine's alternator is likewise reduced. With fewer load demands on the engine 1, it will enjoy a smoother more efficient performance.

This staggered actuation of the warming of catalyst 10 and operation of air pump 19 also prevents the secondary air supplied from cooling down the warmed-up catalyst 10 before its temperature reaches the preset value γ. As a result, the temperature of the catalyst 10 undergoes a virtually uninterrupted rise to a value permitting an efficient catalytic reaction. This results in a significant reduction in toxic emissions exhausted to the atmosphere.

Furthermore, according to this embodiment, the determination whether or not the catalyst 10 is completely operational, and consequently, whether the power supplied to catalyst 10 may be terminated, is based upon the change in the catalyst temperature THC. That is, when the catalyst 10 starts reacting in response to the secondary air supply, the temperature changing rate ΔTHC of the catalyst 10 is changed due to the reaction heat produced in the catalyst 10. To detect this, a single catalyst temperature sensor 34 can sense the catalyst temperature THC of the catalyst 10. The ECU 41 determines whether or not the catalyst 10 has been activated based upon the detected result of the temperature change rate ΔTHC. Therefore, the activation of the catalyst 10 can be detected without providing a plurality of catalyst temperature sensors 34. That is, according to this embodiment, since the single catalyst temperature sensor 34 can accurately detect the activation of the catalyst 10, the constitution for detecting the activation of the catalyst 10 can be simplified.

Since the actuation of the catalyst 10 is determined based upon the catalyst temperature THC, as in the above-described manner, even when the efficiency of the catalyst 10 drops or the catalyst reaction temperature changes due to the catalyst degradation, determining when to actuate the catalyst 10 can be accurately carried out according to the detected temperature values. As a result, the period time for supplying the power to the catalyst 10 may be minimized without regard to efficiency of the catalytic materials in catalyst 10.

Furthermore, according to this embodiment, the period of time for supplying the power to the catalyst 10 is controlled within the range of the reference value B allowing the catalyst temperature to reach a maximum catalyst temperature THCmax. Accordingly, the power supply to the catalyst 10 does not exceed the amount required for efficient operation. Likewise, the conditions of the catalyst 10 and battery 16 are examined before the catalyst 10 is actuated. When an irregular condition thereof is detected, the warning lamps 29 and 30 are lighted and the power supply to the catalyst 10 and air pump 19, etc. is terminated. Therefore, if the catalyst 10 or the battery 16 has some irregular condition, the condition is immediately communicated to the engine operator or driver in order to avoid the activation of the catalyst 10 and air pump 19 under adverse conditions.

Further, according to this embodiment, if the secondary air is supplied to the exhaust gas passage during a state when the engine is cold, the value of the fuel injection volume f0 is correctly increased by a preset amount. The injectors 4 are operably controlled based upon the corrected injection volume amount f0. Therefore, after the catalyst 10 has been actuated, the minimum required amount of fuel for starting the engine is increased by the preset amount. Accordingly, the toxic emissions remaining in the exhaust gas, increased due to the corrected fuel injection amount, are passed to the catalyst 10 and the main catalyst 11.

The combination of the heat of the exhaust gas, the reaction heat generated by the catalyst 10, and the increase amount of the un-burnt elements sent to the main catalyst 11, allow for the acceleration in the temperature of main catalyst 11. After the catalyst 10 is activated, the injection volume f0 will be increased. As a result, un-necessary amounts of fuel are not supplied to the engine 1 while the catalyst 10 is actuated nor is there an increase in the un-burnt elements discharged from the engine 1. The efficient control of catalysts 10 and 11 by ECU 41 according to the above described apparatus therefore prevents toxic exhaust gas emissions from increasing during the warm up stage and during normal engine operation.

Second Embodiment

The second embodiment according to the present invention will now be described in detail referring to FIGS. 10 through 12. The basic mechanical and electrical concepts of a gasoline engine system of the second embodiment is similar to those in the first embodiment. The second embodiment will be described by emphasizing the difference from that presented in the first embodiment.

Figure 10:
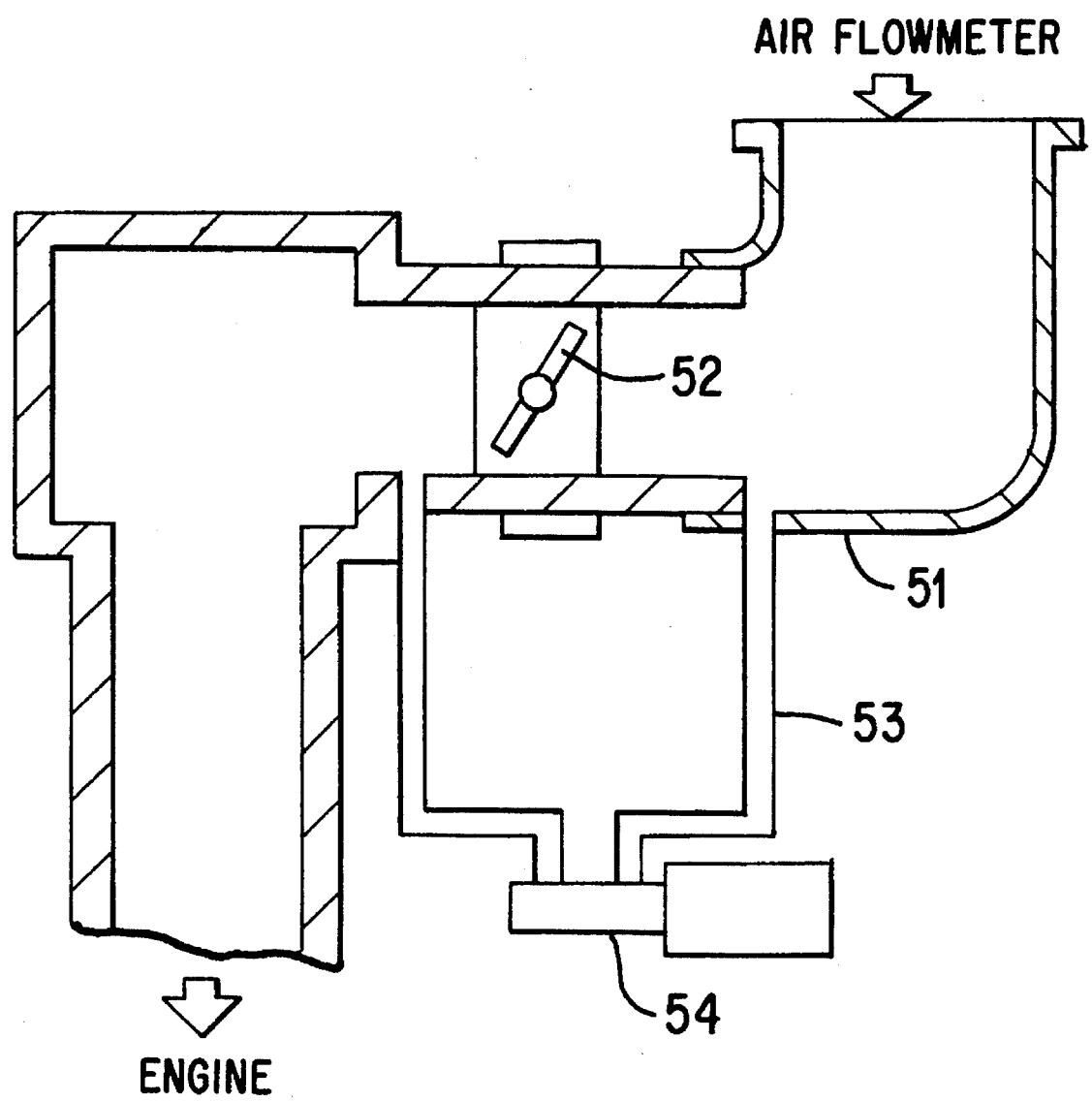
FIG. 10 is a cross-sectional view of an air-intake passage of the gasoline engine system according to the second embodiment of the present invention.

FIG. 10 shows a part of a intake pipe 51 which communicates with the intake manifold 2. A throttle valve 52 is disposed midway along the intake pipe 51. According to this embodiment, a by-pass 53 is provided in the intake pipe 51 which allows the upper stream side to communicate with the lower stream side effectively by-passing the valve 52. A linear solenoid type idling speed control valve (hereinafter referred to as ISCV) 54 is disposed along the by-pass 53 for controlling the intake amount Q required to achieve smooth idling of the engine when the throttle valve 52 is fully closed. The ISCV 54 is operably controlled according to the preset control signal sent from the ECU 41.

During the idling stage of the engine, the opening angle of the ISCV 54 as well as the throughput of air flowing through the by-pass 53 is adjusted, thereby effectively controlling the intake air amount fed into the combustion chambers of the engine 1. As the throughput is slightly increased by the ISCV 54, the engine speed NE during the idling stage is likewise increased. Accordingly, the warm-up operation of the engine 1 is accelerated, and the amount of the exhaust gas discharged from the engine 1 to the exhaust manifold 3 is increased. In effect, the thermal energies carried to the catalyst 10 and the main catalyst 11 are increased in fashion that corresponds to the increase of the discharged exhaust gas from the engine 1.

Figure 11:
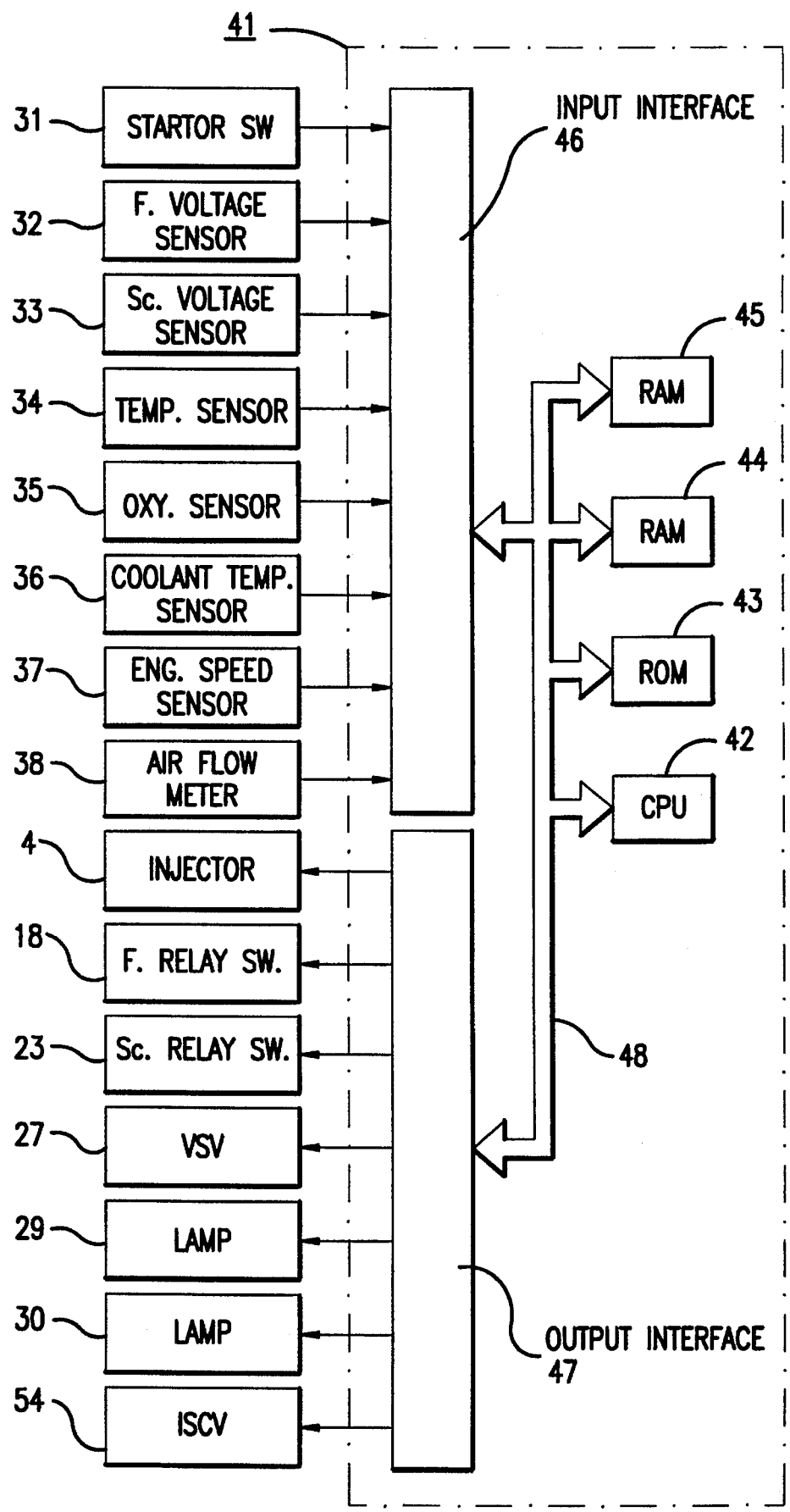
FIG. 11 is a block diagram illustrating configuration of an ECU including memory, a CPU etc,. for controlling the system in FIG. 10.

FIG. 11 is a block diagram showing the electric constitution of the ECU 41 according to this embodiment. The ISCV 54 is electrically connected to the output interface circuit 47. According to this embodiment, after the ECU 41 activates the catalyst 10 based upon the signals sent from the starter switch 31, catalyst temperature sensor 32, coolant temperature 34, etc., the ECU 41 activates the air pump 19. Further, the ECU 41 operably controls both the injectors 4, for effectively regulating fuel injection, and the ISCV 54, for regulating engine idle speed. The ECU 41 also carries out the air-fuel FB control based upon the signal sent from the oxygen sensor 35.

The exhaust gas purification control operation carried out by the ECU 41 at the engine start in the cold state will now be described. The operational contents of the secondary air supply control and the determination of the activation of the catalyst are fundamentally similar to those in the operational routine. Therefore, only the difference in the operational contents are emphasized for description.

Figure 12:
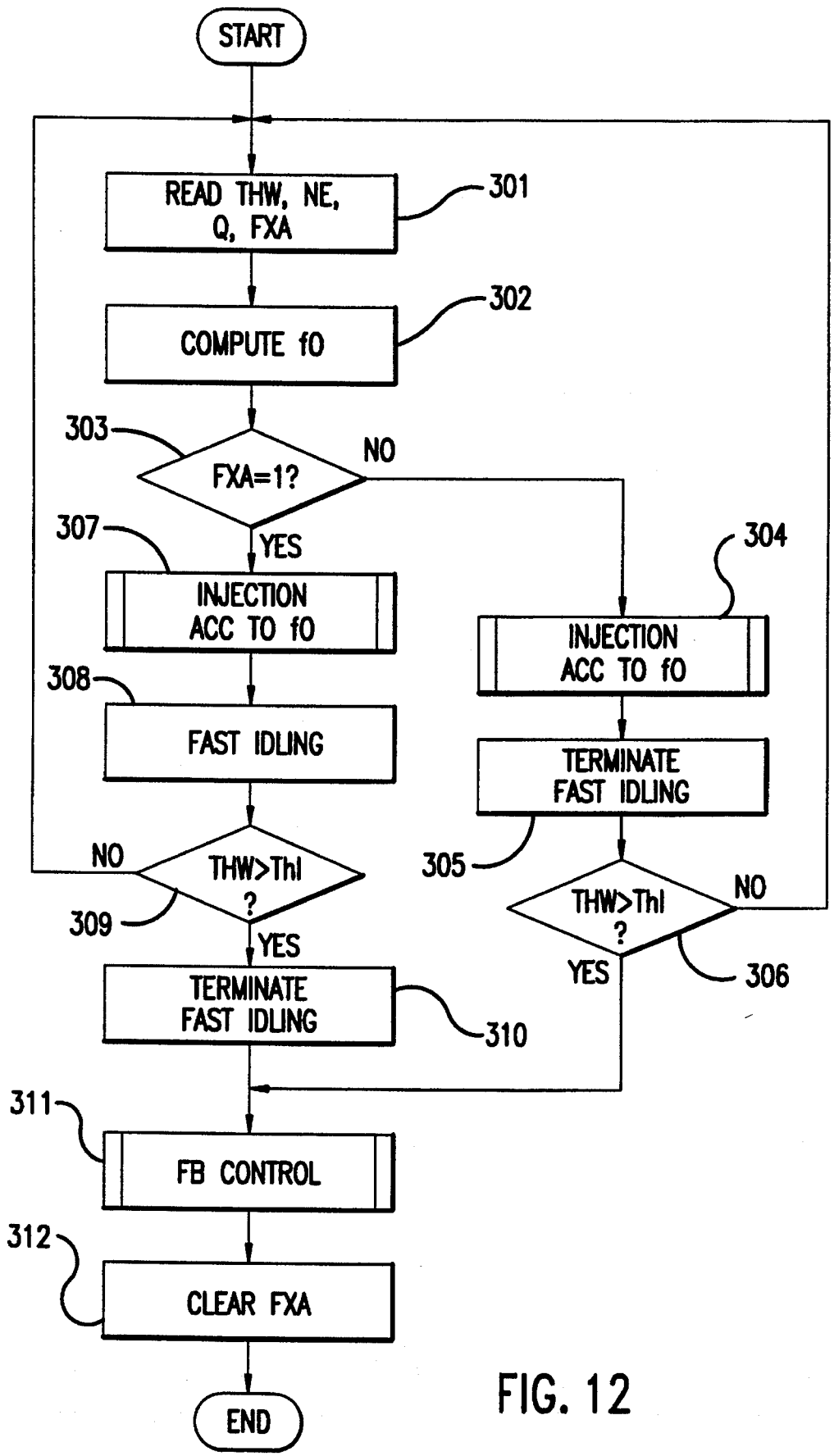
FIG. 12 is a flowchart showing the operational routine for controlling the conditions at the engine initiation time, which is executed by the ECU according to the system in FIG. 10.

FIG. 12 is a flowchart showing the operational routine which is carried out by the ECU 41. This routine starts to be initiated when the IGSW 14 is switched to the ON position. Almost the entire contents of this routine are fundamentally similar to those of the first embodiment shown in FIG. 8.

At step 301, the ECU 41 reads the coolant temperature THW, engine speed NE, intake amount Q and the state of the flag FXA, respectively. Next at step 302, the ECU 41 computes a target initiating injection volume f0 based upon the read coolant temperature THW, engine speed NE, intake amount Q.

At step 303, the ECU 41 determines whether or not the value of the flag FXA is equal to "1". When the flag FXA is not equal to "1", the ECU 41 determines that the catalyst 10 has not been activated, and advances to step 304. At step 304, the ECU 41 carries out the injection operation according to the injection volume f0 computed at step 302. That is, the ECU 41 operably controls the injectors 4 based on the injection volume f0 to allow the fuel to be injected into the intake manifold 2.

At step 305, the ECU 41 terminates the fast idling operation by closing the ISCV 54. That is, the increase of the intake amount Q is terminated.

At step 306, the ECU 41 determines whether or not the value of the coolant temperature THW is larger than the preset value Th1 indicating the warm-up completion temperature. When the value of the coolant temperature THW is not larger than the preset value Th1, the ECU 41 determines that the engine 1 has not been warmed up enough, and carries out the operations at step 301. On the other hand, when the value of the coolant temperature THW is larger than the preset value Th1, the ECU 41 determines that the engine 1 has been warmed up enough, and advances to step 311.

However, when the flag FXA is equal to "1" at step 303, the ECU 41 determines that the catalyst 10 has been activated, and advances to step 307. At step 307, the ECU 41 carries out the fuel injection according to the injection volume f0 similar to the injection at step 304.

At step 308, the ECU 41 carries out the fast idling operation by slightly opening the ISCV 54. That is, the ISCV 54 increases the intake amount Q. Through this procedure, the engine speed NE at an engine idle is increased so as to accelerate the warm-up operation of the engine 1 and also to increase the amount of the exhaust gas discharged from the engine 1 to the exhaust manifold 3.

After that, at step 309, the ECU 41 determines whether or not the value of the coolant temperature THW is larger than the preset value Th1. When the value of the coolant temperature THW is not larger than the preset value Th1, the ECU 41 determines that the engine 1 has not been warmed up enough, and jumps back to step 301 to repeatedly carry out the operation starting from step 301. On the other hand, when the value of the coolant temperature THW is larger than the preset value Th1, the ECU 41 determines that the engine 1 has been warmed up enough, and advances to step 310. As step 310, the ECU 41 closes the ISCV 54 to terminate the fast idling operation.

At step 311 to which the ECU 41 advanced from either step 306 or 310, the ECU 341 carries out the air-fuel FB control of the engine based on the signal sent from the oxygen sensor 35. Further, at step 312, the ECU 41 clears the value of the flag FXA to "0", and then terminates the operation hereafter.

As described above, the control at the engine start corresponding to the secondary air supply control at the engine start is carried out.

As clearly described above, according to this embodiment, after the catalyst 10 disposed at the upper stream side is determined to have been activated while the secondary air is supplied to the exhaust gas passage at the engine start in the cold state, the fast idling operation is carried out to increase the intake amount Q to the engine 1. Therefore, after the catalyst 10 has been activated, the engine speed NE of the engine 1 is increased by the increased amount of the intake air so as to accelerate the warm-up operation of the engine 1 and to increase the amount of the exhaust gas discharged from the engine 1 to the exhaust gas passage. That is, the thermal energies carried to the catalyst 10 and the main catalyst 11 are increased along with the increase of the discharged exhaust gas from the engine 1 to the exhaust gas passage.

Therefore, the thermal energies increased by the exhaust gas is supplied to the main catalyst 11 in addition to the reaction heat generated by the catalyst 10 disposed at the upper stream side, so as to accelerate the activation and the warming up of the main catalyst 11. Further, since the amount of the exhaust gas by the fast idling is increased after the catalyst 10 has been activated, no excessive amount of exhaust gas is discharged from the engine 1 before the catalyst 10 is activated. As a result, the emission may not be worsened in order to achieve the rapid warm-up of the catalyst 10 and main catalyst 11.

The other operations and effectiveness according to the second embodiment are fundamentally similar to those of the first embodiment.

Although only two embodiments of the present invention have been described in detail herein, it should be apparent to those skilled in the art that the present invention may be embodied in many other specific forms without departing from the spirit or scope of the invention. Particularly, it should be understood that the following modes are applied.

In the above-described embodiments, the determination of the activation of the catalyst is utilized for terminating the power supply to the catalyst 10. The determination of the activation of the catalyst can be utilized to detect the activation catalyst for detecting the deterioration of the catalyst.

In the above-described embodiments, when the current temperature changing rate ΔTHC becomes larger than the previous temperature changing rate ΔTHC, the ECU 41 determines that the catalyst 10 has been activated. In contrast to this, some period of time has elapsed since the current temperature changing rate ΔTHC became larger than the previous temperature changing rate ΔTHC, the ECU 41 can determine that the catalyst has been activated. Possibly, when the current temperature changing rate ΔTHC becomes many times larger than the previous temperature changing rate ΔTHCold, the ECU 41 can determine that the catalyst has been activated.

In the above-described embodiments, the catalyst 10 includes honeycomb cores 10a which form a metal catalyst. The electrode 10b is disposed in the central portion of the honeycomb cores 10a, and the section between the hub 10c and the electrode 10b is electrically activated, such that the metal substrate itself heats up, resulting in its heat-up function. The constitution of the catalyst 10 is not limited to the above-described one. It can be any self-heat-up catalyst by the power supply.

In the above described embodiments of the present invention, the catalyst 10 includes a heater. The invention can also be embodied in an apparatus having a catalyst without a heater.

In the above described embodiments of the present invention, the catalyst 10 is included in an in-line type gasoline engine. In other embodiments of the invention the engine could be a V-type gasoline engine or any other type of engine.

In the second embodiment, after the determination of the activation of the catalyst 10 is carried out, the thermal energies supplied from the engine 1 to the catalyst 10 and the main catalyst 11 is increased only through the fast idling operation without the increase of the injection volume f0 with respect to the engine 1. After the determination of the activation of the catalyst 10 is carried out, the injection volume f0 can also be increased in addition to the thermal energies supplied from the engine 1 to the catalyst 10 and the main catalyst 11 is increased only through the fast idling operation.

Therefore, the present examples and embodiments are to be considered as illustrative and not restrictive and the invention is not to be limited to the details given herein, but may be modified within the scope of the appended claims.

What is claimed is:

1. An apparatus for controlling an operation of at least one catalytic converter disposed in an exhaust system of an engine, said engine having an intake system for mixing air and fuel, said apparatus comprising:

detecting means for detecting a temperature of a catalyst in said at least one catalytic converter;

temperature computing means for computing a rate of change of the catalyst temperature based on the detected temperature;

first determining means for determining an activation of the catalyst based on an increase of the computed rate of change of the catalyst temperature; and control means for controlling the operation of the at least one catalytic converter based on at least the activation determined by the first determining means.

2. An apparatus as set forth in claim 1, further comprising a second determining means for determining whether a volume of oxygen supplied to the exhaust system is sufficient to fully react unburned fuel in an exhaust gas supplied to the catalyst.

3. An apparatus as set forth in claim 1, wherein the at least one catalytic converter includes an electric heater for accelerating the activation of the catalyst in said at least one catalytic converter, said electric heater being selectively connected and disconnected with an electric power source.

4. An apparatus as set forth in claim 3, wherein said first detecting means includes a temperature sensor mounted on the catalyst in said at least one catalytic converter.

5. An apparatus as set forth in claim 3, further comprising air supplying means for supplying secondary air to the exhaust system, so as to accelerate the activation of the catalyst in said at least one catalytic converter.

6. An apparatus as set forth in claim 5, wherein said control means, said computing means, and said first determining means comprise a controller.

7. An apparatus as set forth in claim 5, wherein said catalyst comprises an upstream catalyst portion and a downstream catalyst portion, and further comprising:

fuel supplying means for supplying fuel to the intake system;

fuel computing means for computing a first fuel volume required for a cold operation of the engine and for computing a second fuel volume required for warming up the downstream catalyst portion; and actuating means for actuating the fuel supplying means in accordance with the first fuel volume when the upstream catalyst portion is in a non-activated state, and for actuating the fuel supplying means in accordance with a sum of the first fuel volume and the second fuel volume when the upstream catalyst portion is in an activated state and the air supplying means supplies secondary air to the exhaust system.

8. An apparatus as set forth in claim 3, wherein the electric heater is disconnected from the electric power source when at least a portion of the catalyst in said at least one catalytic converter is determined to be activated.

9. An apparatus as set forth in claim 1, wherein said catalyst comprises an upstream catalyst portion and a downstream catalyst portion the electric heater being located in the upstream catalyst portion.

10. An apparatus as set forth in claim 9, wherein said first determining means determines the activation of the upstream catalyst portion.

11. An apparatus as set forth in claim 10, further comprising heat providing means for providing heat energy to the exhaust system, said heat providing means increasing the heat energy provided to the exhaust system when the upstream catalyst portion is activated.

12. An apparatus as set forth in claim 11, wherein the heat providing means comprises a bypass passage and an idle speed control valve for increasing a volume of air provided to the intake system.

13. An apparatus as set forth in claim 9, further comprising an injector and an intake manifold, said injector increasing the fuel volume injected to the intake manifold.

14. An apparatus as set forth in claim 9, wherein the electric heater causes the upstream catalyst portion to be activated during a cold engine operation.

15. An apparatus as set forth in claim 9, further comprising:

fuel supplying means for supplying fuel to the intake system;

fuel computing means for computing a first fuel volume required for a cold operation of the engine and for computing a second fuel volume required for warming up the downstream catalyst portion; and means for actuating the fuel supplying means in accordance with the computed first fuel volume when the upstream catalyst is in a non-activated state during the cold operation of the engine, and for actuating the fuel supplying means in accordance with a sum of the first fuel volume and the second fuel volume after the upstream catalyst portion is activated during the cold operation of the engine.

16. An apparatus for controlling operation of at least one catalytic converter disposed in an exhaust system of an engine, said engine having an intake system for mixing air and fuel, said apparatus comprising:

a catalyst in said at least one catalytic converter comprised of an upstream catalyst portion and a downstream catalyst portion;

an electric heater mounted on the upstream catalyst portion, said heater accelerating an activation of the upstream catalyst portion and being selectively connected to and disconnected from an electric power source;

a temperature sensor for detecting a temperature of the upstream catalyst portion;

temperature computing means for computing a rate of change of the temperature of the upstream catalyst portion based on the detected temperature of the upstream catalyst portion;

judging means for judging whether a volume of oxygen supplied to the exhaust system is sufficient to fully react unburned fuel in an exhaust gas supplied to the catalyst;

determining means for determining an activation of the upstream catalyst portion based on the computed rate of change of the temperature of the upstream catalyst portion; and a controller for controlling the operation of the at least one catalytic converter based on at least the activation determined by the determining means.

17. An apparatus as set forth in claim 16, further comprising air supplying means for supplying secondary air to the exhaust system, so as to accelerate the activation of said catalyst in the at least one catalytic converter.

18. An apparatus as set forth in claim 17, further comprising:

fuel supplying means for supplying fuel to the intake system;

fuel computing means for computing a first fuel volume required for a cold operation of the engine and for computing a second fuel volume required for warming up the downstream catalyst portion; and actuating means for actuating the fuel supplying means in accordance with the first fuel volume when the upstream catalyst portion is in a non-activated state, and for actuating the fuel supplying means in accordance with a sum of the first fuel volume and the second fuel volume when the upstream catalyst portion is in an activated state and the air supplying means supplies secondary air to the exhaust system.

19. An apparatus as set forth in claim 16, wherein the electric heater is disconnected from the power source when the upstream catalyst portion is determined to be activated.

20. An apparatus as set forth in claim 16, further comprising heat providing means for providing heat energy to the exhaust system, said heat providing means increasing the heat energy provided to the exhaust system when the upstream catalyst portion is activated.

21. An apparatus as set forth in claim 16, further comprising an injector and an intake manifold, said injector increasing a fuel volume injected to the intake manifold.

22. An apparatus as set forth in claim 16, wherein the upstream catalyst portion is activated during part of a cold engine operation, further comprising:

fuel supplying means for supplying fuel to the intake system;

fuel computing means for computing a first fuel volume required for a cold operation of the engine and for computing a second fuel volume required for warming up the downstream catalyst portion; and actuating means for actuating the fuel supplying means in accordance with the computed first fuel volume when the upstream catalyst portion is in a non-activated state during the cold operation of the engine, and for actuating the fuel supplying means in accordance with a sum of the first fuel volume and the second fuel volume after the upstream catalyst portion is activated during the cold operation of the engine.

* * * * *